United States Patent [19]

Smith et al.

[11] Patent Number: 5,095,058

[45] Date of Patent: Mar. 10, 1992

[54] STABLE POLYAMIDE RESIN DISPERSIONS AND METHODS FOR THE MANUFACTURE THEREOF

[75] Inventors: George A. Smith, Newtown, Pa.; Scott R. Hagedorn, West Trenton, N.J.

[73] Assignee: Union Camp Corporation, Wayne, N.J.

[21] Appl. No.: 664,276

[22] Filed: Mar. 4, 1991

Related U.S. Application Data

[63] Continuation-in-part of Ser. No. 537,318, Jun. 13, 1990, abandoned.

[51] Int. Cl.$^5$ .............. C08J 3/00; C08J 3/20; C08K 5/16; C08G 69/10
[52] U.S. Cl. ................... 524/238; 524/240; 524/606; 524/217; 523/353; 523/326; 528/328
[58] Field of Search ............ 523/326, 353, 223; 524/253, 538, 606, 607, 608, 236, 238, 239, 240, 217, 221, 237; 528/328

[56] References Cited

U.S. PATENT DOCUMENTS

| | | | |
|---|---|---|---|
| 4,200,601 | 4/1980 | McClain | 524/238 |
| 4,853,421 | 8/1989 | Hayes | 524/606 |
| 4,886,844 | 12/1989 | Hayes | 524/606 |

*Primary Examiner*—Kriellion S. Morgan
*Assistant Examiner*—Patrick Niland
*Attorney, Agent, or Firm*—William K. Wissing

[57] ABSTRACT

Aqueous dispersions of polyamide resins having improved stability with respect to gelation and phase separation are provided, along with preparative methods therefor. The improved stability of the provided aqueous dispersions is achieved by the addition to such dispersion of a chemical moiety, such as a water soluble, amphoteric amino acid, anionic and cationic salts of amino acid, or mixtures thereof, in aqueous solutions. In a preferred embodiment, a dispersion-stabilizing amount of glycine is added with the inversion water used to invert an emulsion of water in polyamide resin. The resulting emulsion of resin in water is then cooled below the resin's melting point, causing the emulsified droplets of the polyamide resin to solidify as finely divided particles which are dispersed uniformly through the aqueous phase. The stable, aqueous dispersions of this invention are useful in coatings, inks, and as coatings for hot melt adhesive applications.

36 Claims, No Drawings

STABLE POLYAMIDE RESIN DISPERSIONS AND METHODS FOR THE MANUFACTURE THEREOF

This application is a continuation-in-part of our co-pending application, Ser. No. 07/537,318, filed June 13, 1990 and abandoned May 15, 1991.

BACKGROUND OF THE INVENTION

This invention relates to aqueous dispersions of polyamide resins and more particularly, to aqueous dispersions of polyamide resins having improved stability against gelation and phase separation.

Polyamide resins are well known as a class of resins, as are numerous methods for their preparation. Polyamide resins are typically manufactured by reacting a di- or polyfunctional amine with a di- or polyfunctional acid. Most commonly-employed diacids and diamines yield polyamide resins which are essentially linear. The properties of polyamide resins will vary considerably, depending upon the particular synthetic reactants employed. Polyamide resins which are prepared from relatively short chain diacids and diamines having, for example, 5-10 carbon atoms will tend to be relatively crystalline and have excellent fiber forming properties. These types of polyamide resins are typically referred to as nylons.

Polyamide resins are also prepared from relatively long chain polyfunctional acids and diamines. A particularly important class of polyamide resins of this type are referred to as polymerized fatty acid polyamide resins. The polymerized fatty acid polyamide resins are especially useful in products such as hot melt adhesives, water resistant coatings, and printing inks because of their physical properties, including high strength, excellent flexibility, water and solvent resistance, and the ability to form smooth, non-tacky coatings.

The polyfunctional acids used in the preparation of polymerized fatty acid polyamide resins are derived from higher unsaturated fatty acids by polymerization. In the polymerization process, the fatty acids having double bond functionalities combine to produce mixtures of higher polymeric acids. The polymerized fatty acid polyamide resins are, in turn, typically prepared by reacting one or more suitable diamines—most commonly relatively short chain diamines—with the polymerized fatty acid. Often, another diacid is also reacted to increase the softening point or other properties. The polymerized fatty acid polyamide resins which are obtained tend to be more amorphous than the nylon type of polyamides resins and are generally more flexible. The differences in the physical properties of the polymerized fatty acid polyamide resins as compared to the nylon type of polyamide resins are considered to be related to the long chain length of the polymerized fatty acid component.

The polymerized fatty acid polyamide resins are widely used in a variety of industrial applications. Polymerized fatty acid polyamides are especially useful as hot melt adhesives and for forming water and solvent resistant coatings on substrates such as paper. An important related use of polymerized fatty acid polyamide resins is as binders in printing inks and the like where film toughness, flexibility, and adhesion are important properties.

One of the problems encountered with the polyamide resins—particularly the polymeric fatty acid polyamides—relates to the methods used to apply the resins to substrates. One method which has been suggested involves heating the polyamide resins above their melting point and then applying the molten resins to the substrate. This technique, however, has certain inherent problems. For example, polyamide resins typically have high melting points, often higher than the thermal stability of the substrates onto which they are to be applied. Accordingly, the hot melt method can only be used in certain limited applications which require relatively expensive application equipment. Thus, the use of molten polyamide resins is not practical in applications such as, for example, printing. Molten polyamide resins are also impractical where the resin is to be applied as a latent hot melt layer to be activated at a later time. For example, it may be desired to apply a polyamide resin to a textile interliner, incorporate the interliner into a garment, and then activate the adhesive to hold the assembled parts of the garment in position.

It has been recognized that certain of the problems associated with the polyamide resins might be solved if the polyamides could be applied at ambient temperatures as a solution or a dispersion. For many applications, however, solutions of polyamide resins are unsatisfactory. Polyamide resins as a class have excellent resistance to solvents; even with respect to those solvents in which the polyamide resins are soluble, the solubility typically is relatively low. Furthermore, the solvents which have been used to make polyamide resin solutions often adversely react with the substrates to which the polyamide resin solutions are applied. A further problem associated with solvent solutions is that most solvents used are relatively expensive, often difficult or impossible to remove from the applied coatings, and present fire, toxicity, and environmental pollution problems.

To overcome or at least reduce the problems associated with such solvent solutions, it has been suggested to prepare emulsions or dispersions of the polyamide resins in water. Early emulsions were prepared by initially dissolving the polyamide resin in an organic solvent and then using selected emulsification agents to form an emulsion of the solvent solution and water. The resulting solvent/water polyamide resin emulsions still had the problems associated with the presence of solvents and were relatively unstable. In addition, films formed from these emulsions tended to have an undesirable tackiness. Those skilled in the art will appreciate that instability is manifested in aqueous resin dispersions by phenomena such as phase separation or undesired interparticle interactions resulting in agglomeration, better known to those skilled in the art as gelation.

In British patent 1,491,136 there was disclosed a method for forming aqueous dispersions of various plastic powders, including polyamide resin powders. In the disclosed method, the polymer resin was first mechanically reduced to a powder form and then blended with water and a thickening agent. The method was less than satisfactory. The mechanical reduction of the resins to the required particle size was both expensive and difficult to control and often caused thermal degradation of the polymers. Furthermore, the resulting thickening dispersions had limited utility in many applications because of the relatively high viscosity and the presence of the thickening agent.

It is also known to render a polyamide resin more readily dispersible in water by chemically modifying the resin so as to include solubilizing groups. This includes, for example, incorporating alkoxymethyl groups, as disclosed in U.S Pat. No. 2,430,860 (Carirns) and U.S. Pat. No. 2,714,075 (Watson, et al.). However, the incorporation of the additional groups into the polyamide resin increases the cost of the polymer and also typically reduces the desirable properties of the polyamide resins, especially in relation to water and solvent resistance.

Another known method for increasing the water dispersibility of polyamide resins involves formation of a resin having a considerable excess of either free carboxyl or free amine groups. At least a portion of the free acid or free amine groups are then neutralized to form salt groups on the polyamide resin, which salt groups act as internal surfactants to facilitate the dispersion of the modified polyamide in water. In U.S. Pat. No. 2,811,459 (Witcoff, et al.) there is disclosed a method for preparing polymerized fatty acid polyamide dispersions wherein the polyamide is formed from a substantial excess of a diamine. The resulting polyamide resins are then dispersed in an aqueous solution of an acid so that the acid forms salt groups which act as an internal surfactant to allow formation of an aqueous dispersion In U.S. Pat. No. 2,768,090 (Witcoff, et al.) a similar process is disclosed wherein the excess amine groups of a polyamide resin are reacted with an acid to form intrinsic ammonium salt groups and, hence, a cationic dispersion which is converted to an anionic dispersion by charge inversion. A similar salt forming process utilizing free amino groups was disclosed in U.S. Pat. No. 2,824,848 (Witcoff). In U.S. Pat. No. 2,926,117 (Witcoff) there is disclosed a method wherein the polyamide resin formed with a deliberate excess of acid groups is then dispersed in an aqueous medium containing an alkaline substance to cause formation of salt groups which act as internal surfactants.

The discussed methods for preparing aqueous dispersions of polymerized fatty acid polyamides having salt groups are relatively effective in initially forming aqueous dispersions. However, the dispersions have limited stability and are not satisfactory for use in many applications, as their synthesis requires the presence of substantial amounts of free acid or free amino groups which adversely effect the performance properties of the dispersed polyamide resin. Optimal properties are typically achieved by conducting the amidations so as to cause as complete as a reaction as possible. This requires that approximately stoichiometric amounts of the starting diacid and diamine be employed and that the reaction be conducted so as to produce a final product having a low amine number and low acid number. The presence of substantial excesses of either reactant or an incomplete reaction—as required for the prior art salt forming polyamide material—inherently reduce the chain length and the resulting strength and flexibility of the polyamide resin.

Furthermore, incorporation of polymers having substantial excess amounts of unreacted polymerized fatty acids typically results in unstable materials. The fatty acids can be liberated from the polymer and cause exceptional tackiness and undesirable degradation of the desired properties of the polyamide resin. These polyamide resins continue to react during application, which causes increases in molecular weight and coating viscosity, as well as changes in the melting point. A still further problem encountered with the method wherein the salt forms of the polyamide resins are used is that the salts tend to decompose during application and the resulting material when applied becomes undesirably tacky. This is particularly undesirable in many applications, such as in printing inks and protective coatings.

The stability of aqueous dispersions of polyamide resin may in certain applications be improved by the use of casein and other thickening agents and in many cases may cause gelation. However, thickening agents only slow down phase separation. These materials are retained in the resin and may have undesirable application properties.

Because of the problems associated with the polymerized fatty acid polyamide resins having large amounts of salt groups formed as part of the polymer, the aqueous dispersions of these particular types of resins have had no substantial commercial success.

SUMMARY OF THE INVENTION

This invention provides aqueous dispersions of polyamide resin having improved stability against phase separation and gelation. The improved stability of aqueous dispersions according to this invention is achieved by the addition to such dispersion of a water soluble, amphoteric chemical moiety, such as an amino acid, anionic or cationic salts of amino acid, or mixtures thereof, which exhibit dipolar character in aqueous media.

In one preferred method of this invention, a polymerized fatty acid polyamide resin which has been prepared so as to have a low acid and low amine number is mixed in solidified form with water, neutralizing agent, and an amount of a nonionic surfactant which will promote the emulsification of the polyamide resin in water. The mixture is heated to a temperature at least as high as the resin's softening point to form a water-in-oil emulsion, which is inverted by adding thereto an effective amount of inversion water, in which has been dissolved a dispersion-stabilizing amount of glycine. The resulting emulsion of polyamide resin in water is then cooled below the resin's melting point, causing the emulsified droplets of the polyamide resin to solidify as finely divided particles which are dispersed uniformly through the aqueous phase. The resulting stable aqueous dispersions of the polymerized fatty acid polyamide resin which are obtained are useful when applied as coatings for hot melt adhesive applications, or utilized in coatings, inks, and the like.

DETAILED DESCRIPTION OF THE INVENTION

A wide variety of water soluble, amino acids may be incorporated into aqueous dispersions of polyamide resin in accordance with this invention, so long as they possess sufficient dipolar character to improve the stability of said dispersions. It is believed that amino acids, due to their amphoteric or dipolar nature in an aqueous medium, stabilize aqueous dispersions of polyamide resin by disrupting often strong interactions between dispersed polyamide resin particles.

The amino acids used in the process of this invention are of the formula

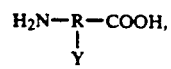

wherein "R" represents an alkyl, alkenyl or aryl group of one to ten carbon atoms and "Y" is any polar or non-polar ionic or non-ionic substituent. Examples of such amino acids are para-aminobenzoic acid, glycine, arginine, phenylalanine and serine. Particularly preferred is glycine and para-aminobenzoic acid. Additionally, anionic or cationic salts derived from those amino acids and mixtures thereof may also be used to stabilize the aqueous dispersions of the polyamide resin. Mixtures of amino acids and the salts of amino acids may also be used to stabilize the aqueous dispersions.

According to the present invention, stable aqueous dispersions of polyamide resin comprise at least one amino acid. Amino acids may be incorporated as a reactant during formation of a polyamide dispersion or may be incorporated into a dispersion after the formation thereof. It is preferred that polyamide resin dispersions comprise amino acids upon formation.

In general, the methods of the present invention provide aqueous dispersions of polyamide resin by the controlled cooling of an emulsion of the resin in water. Those skilled in the art will appreciate that such emulsions, more commonly known as oil-in-water emulsions, are to be contrasted with emulsions of water in polyamide resin, which emulsions are more commonly known as water-in-oil emulsions.

Thus, in one embodiment, polyamide resin is liquified by heating it to at least its melting point, preferably to a temperature at which the resin melt viscosity is about 5000 centipoise (cps), as measured by a Brookfield Viscometer. The liquification process is preferably conducted in a closed vessel under a protective blanket of inert gas such as nitrogen. The melting temperature of the polymerized fatty acid polyamide resin will vary considerably depending upon the particular starting reactants employed to prepare the polyamide resin. Typically, however, fatty acid polyamide resins will melt in the temperature range from somewhat below the boiling point of water to somewhat above the boiling point of water. If the temperature to which the molten polyamide resin will be heated for liquification is above the boiling point of water, the process equipment used in the method of the present invention must be capable of being operated at elevated pressures and temperatures.

In a separate vessel, water is heated to a temperature which is preferably at least as high as the melting point of the polymerized fatty acid polyamide resin which is to be dispersed.

In an alternative method, the water is heated to a temperature somewhat below the temperature of the polymerized fatty acid polyamide resin and the resin is heated to a temperature significantly above its melting point, such that the resulting blend of water and polyamide resin will have a temperature above the melting point of the polyamide resin.

In accordance with this invention, a predetermined amount of one or more amino acid is added to the molten polymerized fatty acid polyamide resin, to the water, or to both the polyamide resin and the water. As discussed, an added amino acid should be effective to improve the stability of an aqueous dispersion of polyamide resin.

Additionally, a water soluble surfactant or combination of surfactants is added to the molten polymerized fatty acid polyamide resin, to the water, or to both the polyamide resin and the water in a predetermined amount. In preferred embodiments, surfactants are either added directly to the molten polyamide resin or in solution with the water to be used in the emulsification process. The surfactant, however, is most preferably added to the water because of the relative ease of addition. The surfactant or combination of surfactants which are used in the process of this invention are ones which will promote the emulsification of the molten polyamide resin and the water and which will also act to stabilize the final dispersion of the polyamide resin in the water.

In certain embodiments, the liquified polymerized fatty acid polyamide resin, the heated water, and the surfactant are mixed together in a predetermined ratio while maintaining the temperature of the individual components and the mixture which is obtained above the melting point of the polymerized fatty acid polyamide resin. In other embodiments, fatty acid polyamide resin in solidified form is mixed with water and the surfactant, and the mixture is heated to a temperature sufficient to liquify the resin. In either case, it is important that the equipment utilized be heated to appropriate temperatures to prevent the premature deposition of liquified polyamides on the equipment and a cooling of the blend of materials. The fatty acid polyamide resin, the water and the surfactant are blended in ratios such that the resulting mixture of materials will contain from about 10 to 60—preferably about 50—percent by weight of the polymerized fatty acid polyamide resin.

The mixture is then subjected to comminuting forces sufficient to form a finely divided emulsion in which the droplets of the molten polymerized fatty acid polyamide resin preferably have a volume average size distribution of 20 microns or less in diameter and, more preferably, 5 microns or less in diameter. Particle size distribution can be determined by a number of methods, such as sedimentation or laser light scattering techniques. The particular type of apparatus used for applying the comminuting force to the blend of the polyamide resin, water, and surfactant is to some extent a matter of choice and can include apparatus which operates on the basis of shear, impact, or a combination of these process steps. The equipment includes commercially available apparatus such as homogenizers, submicron dispersers, emulsifiers, colloid mills, ultrasonic sound mixers, simple paddle mixers and the like. In general it is preferable for process purposes to run the blend through the comminuting equipment for one pass in that this facilitates the manufacturing process. It should be appreciated however that the blend may be sent through the comminuting equipment for a number of passes in order to obtain the smaller size droplets. In general, the smaller the size of the liquid droplets of an emulsion, the more stable to sedimentation will be the dispersion made therefrom.

In yet another embodiment of the present invention, aqueous dispersions of polyamide resin are provided by first preparing an emulsion of water in polyamide resin, then adding water thereto to produce an emulsion of polyamide in water. Such techniques for converting water-in-oil emulsions to oil-in-water emulsions are generally known to those skilled in the art as inversions. The conversion of an oil-in-water emulsion to a water-in-oil emulsion is also an inversion. The water added to invert an emulsion is known a inversion or dilution water.

Thus, according to these embodiments, a polyamide resin is provided in solidified form and blended with water and an amount of emulsifying agent sufficient to form an emulsion of the water in the resin. This resin/water/surfactant composition is then heated to a temperature above the resin's softening point, preferably to a temperature at which the resin melt viscosity is about 5000 cps. As in preparing an emulsion of resin in water, this liquification process is preferably conducted in a closed vessel under a protective blanket of nitrogen. However, the amount of water used should be sufficient to form an emulsion having a resin concentration of greater than about 75 weight percent.

The composition is then mixed under low shear conditions to form the water-in-oil emulsion. To this emulsion is then added a sufficient amount of inversion water to invert the water-in-oil emulsion to an oil-in-water emulsion (i.e., polyamide resin in water). In certain preferred embodiments, the inversion water comprises a sufficient amount of an amino acid to stabilize the aqueous dispersion which will ultimately be formed. Alternatively, the effective amount of amino acid can be added to the resin along with the water and surfactant or it can be added in divided portions in both the inversion water and with the water and surfactant.

After an emulsion of polyamide resin in water has been provided by the chosen technique, the next step in preferred embodiments of this invention concerns cooling the emulsion to a temperature below the melting point of the polymerized fatty acid polyamide resin so as to cause the finely divided droplets in the emulsion to solidify into finely divided dispersed particles. The cooling is preferably conducted in a relatively rapid fashion so as to prevent coagulation of the particles during that portion of the solidification wherein the droplets become semi-solid and highly adhesive. Cooling of the emulsions prepared at super atmospheric pressures can be rapidly performed by pumping the emulsion through a heat exchanger or the like. Alternatively, or in addition to using a heat exchanger, the cooling can be caused by evaporation of water from a rapid reduction in the pressure. It is preferred in accordance with this invention that resin emulsions be cooled so a to produce particles having a volume average particle size less than about 10 microns, preferably less than about 2 microns, as measured by laser diffraction or light scattering techniques.

It will be appreciated that there exist numerous types of polyamide resins which may be employed to form aqueous dispersions according to the present invention. Such resins can be obtained commercially or can be prepared by generally well known methods. It is preferred that aqueous dispersions be formed from polymerized fatty acid polyamide resins which have low acid and low amine numbers (i.e., less than about 10 to 12). However, aqueous dispersions have been formed from polymerized fatty acid polyamide resins with acid numbers of about 40 to about 45 and amine numbers of about 230 to about 250. In all cases, it is necessary to add base to neutralize a resin having residual acid number or to add acid to neutralize a resin having residual amine number. Preferred neutralizing bases are potassium hydroxide, sodium hydroxide, ammonium hydroxide, and ethanolamines. Preferred neutralizing acids are acetic acid, hydrochloric acid, sulfuric acid, and phosphoric acid. It is preferred that the amount of acid or base be added along with the surfactant and be sufficient to neutralize an acid or amine number up to about 7 to 8. It will be appreciated that acid number represents the titratable acid present in a gram of resin expressed in terms of milligrams potassium hydroxide required to neutralize that amount of acid. Likewise, amine number represents the titratable base present in a gram of resin expressed in terms of equivalent milligrams potassium hydroxide.

The term "polymerized fatty acid" is intended to be generic in nature and to refer to polymerized acids obtained from fatty acids. The term "fatty acids" refer to saturated, ethylenically unsaturated and acetylenically unsaturated, naturally occurring and synthetic monobasic aliphatic carboxylic acids which contain from 8 to 24 carbon atoms. While specific references are made in this application to polymerized fatty acid polyamide resins which are obtained from C-18 fatty acids, it will be appreciated that the methods of this invention can likewise be employed with other polymerized fatty acid polyamides.

The preferred starting acids for the preparation of the polymerized fatty acids used in this invention are oleic and linoleic acids, due to their ready availability and relative ease of polymerization. Mixtures of oleic and linoleic acids are found in tall oil fatty acids, which are a convenient commercial source of these acids. Fatty acids can be polymerized using various well known catalytic and noncatalytic polymerization methods. A typical composition of the polymerized C-18 tall oil fatty acids which are used as the starting materials for the polyamide resins used in the present invention is:

| C-18 | monobasic acids (monomer) | 0–15% by wt. |
|---|---|---|
| C-36 | dibasic acids (dimer) | 60–95% by wt. |
| C-54 | (or higher) trimer acid or polybasic acids | 0.2–35% by wt. |

In preparing polymerized fatty acid polyamide resins for use in the present invention, it is preferable that the starting polymerized fatty acid contain as high a percentage as possible of the dimer (C-36 dibasic) acid in order to obtain optimum physical properties in the final product.

In addition to the polymerized fatty acids, a wide variety of dicarboxylic acids can be used to prepare polymerized fatty acid polyamide resins, including aliphatic, cycloaliphatic and aromatic dicarboxylic acids. Representative of such acids—which may contain from 2 to 22 carbon atoms—are oxalic, glutaric, malonic, adipic, succinic, suberic, sebacic, azelaic, pimelic, terephthalic, isophthalic, phthalic, naphthalene dicarboxylic acids and 1,4- or 1,3-cyclohexane dicarboxylic acids. Preferred dicarboxylic acids employed in the invention are straight chain aliphatic diacids having at least 6 carbon atoms and more preferably 6 to 22 carbon atoms such as azelaic, sebacic, 1,18-octadecane dicarboxylic and 1,16-hexadecane dicarboxylic acids, the former two being most preferred. It should be understood that use of the corresponding acid anhydrides, esters, and acid chlorides of these acids is included in the term "dicarboxylic acid". These preferred acids and anhydrides are readily available from commercial sources and methods for their preparation are well known.

The diamines used in the preparation of the polymerized fatty acid polyamide resins employed in the present invention may be one or more of the known aliphatic, cycloaliphatic or aromatic diamines having from about 2 to 20 carbon atoms. Preferred are the alkylene diamines, such as ethylene diamine, 1,3-diaminopropane, 1,4-diaminobutane, terephthalyl diamine, known as p-xylene diamine, 1,6-hexamethylene diamine, 4,4′-methylenebis(cyclohexylamine), 2,2-bis-(4-cyclohexylamine) propane, polyglycol diamines, isophorone diamine, isophthalyl diamine, known as m-xylene diamine, cyclohexanebis(methylamines), 1,4-bis-(2'-aminoethyl)benzene, and 4,4'-methylenebis(cyclohexylamine). These diamine compounds are all prepared by well known methods and many are commercially available. Particularly preferred are the straight chain aliphatic diamines of 2 to 20 carbons atoms, especially ethylene diamine and hexamethylene diamine, and cycloaliphatic diamines, especially 4,4'-methylenebis(cyclohexylamine).

In the method of the present invention, it is desirable to use as the polymerized fatty acid polyamide a material which is the result of as complete an amidation reaction as possible between the starting polymerized fatty acid and the diamine. Those skilled in the art will recognize that the degree of completion of the amidation process can be determined by evaluating the acid number and the amine number of the final polymer. The term acid number refers to the number of milligrams of potassium hydroxide required to neutralize the free acid in one gram of the polymer. The term amine number refers to the number of milligrams of potassium hydroxide equivalent to the free or excess amine groups present in the final polymer. Ideally, the amine and the acid numbers of the polyamide resin employed should be zero (0). However, it is often difficult, if not impossible, to reach a perfect balance of the amine and carboxylic acid groups in the polyamide. It has been found, however, that polymerized fatty acid polyamide resins having relatively low amine numbers of, for example, up to about 10 and acid numbers up to about 12, are especially useful in the present invention.

The number of free acid groups and free amine groups present in the polymerized fatty acid polyamide resin are directly related to the relative amount of the polymeric fatty acids, dicarboxylic acids and the diamines involved in the polymerization reaction and the degree of completion of the reaction. For the above reasons, approximately stoichiometric amounts Of the polymerized fatty acids plus the dicarboxylic acids and the diamines based on the total number of available acid and amine groups should be used to prepare the polyamide resins for this invention and the reaction conditions should be selected to ensure completion or substantial completion of the amidation reaction. The reaction conditions required for the amidation reaction are generally well known in the art with the reaction being generally conducted at temperatures from about 100° C. to 300° C. for from about 1 to about 8 hours.

It will be appreciated that there exist a wide variety of water soluble surfactants that can be successfully employed in preparing dispersions according to this invention, in part because of the relative neutral charge of most polymerized fatty acid polyamide resins. Those skilled in the art will recognize that the choice of a surfactant will depend intimately upon the particular polypolyamide resin employed. The surfactants which are selected are those which are capable as acting either as oil-in-water or water-in-oil emulsifying agents for the polyamide resin-water mixture. The surfactants include well known anionic, polar and non-polar non-ionic, amphoteric, and cationic surfactants.

The cationic surfactants which have been found to be especially useful are tallow diamines, such as Jet Amine DT, tallow ammonium chloride salts, such as Jet Quat DT-50, and ethoxylated tallow amines, such as Jet Amine DT-5, all manufactured by Jetco Chemicals, Inc.

Among the anionic surfactants which have been found to be especially useful are phosphate esters of ethoxylated nonylphenols, such as Tryfac 5556 (Henkel), sodium and potassium salts of fatty acids and rosin acids, such as Unitol BKS and NCY Rosin (Union Camp Corporation), and sodium lauryl ether, such as Sipon ES (Alcolac).

Among the nonionic surfactants which have been found to be especially useful are Tergitol NP-40 (Union Carbide) and ethoxylated nonylphenols and octylphenols, such as the Triton N and X series (Rohm & Haas), respectively.

While not all surfactants are suitable for use in the method of the present invention, it has been found that a wide range of surfactants are suitable. It is relatively simple to screen suitable surfactants for use in the presence of this invention. It was found for certain embodiments, for example, that the preferred surfactants are those which exhibit outstanding ability to cause the emulsification of the liquified polymerized resin in the water. These surfactants are typically also highly effective in imparting a long term stability to the final dispersion. The relative amount of the employed surfactant added is based on the amount of the polymerized fatty acid polyamide resin which is to be present in the final dispersion and on the particular surfactant used. It has been found, however, that optimum results are obtained when the surfactant is used in an amount from about 0.2 to about 10 and preferably 0.2 to about 2 percent by weight based on the weight of the polymerized fatty acid polyamide resin.

The dispersions which are obtained according to this invention are characterized by excellent stability. In the methods used in the prior art, when low amine, low acid number, polymerized fatty acid polyamide resins of the type used in this invention were dispersed using the salt forming technique, the resulting dispersions would tend to build viscosity to the point where a solid was formed, indicating very strong interparticle interactions.

The polymerized fatty acid polyamide resin dispersions prepared in accordance with the present invention do not solidify even when allowed to stand at ambient temperatures for twenty-four hours or more. For purposes of this specification the term "stable" refers to the stability of dispersion which when cooled to ambient temperatures, that is, room temperature, will not solidify within twenty-four hours. It has been found however that the dispersions prepared in accordance with this invention typically will be stable over extremely long periods of time with stabilities in excess of six months not being uncommon. Furthermore, the dispersions of this invention do not require that the starting polymerized fatty acid polyamide resin be initially solvated in a strong solvent or that the polyamide resin be formed with excess amine and acid groups to allow for salt formation as is required in the prior art methods of forming dispersions. A further advantage of the polyamide resin dispersions of this invention is that the dispersions, once formed, can be freeze-dried resulting in a finely divided powder which can be redispersed with minimal agitation to reform a stable dispersion. The excellent stability of the dispersions of this invention are further shown by the ability of the dispersions to undergo repeated freeze-thaw cycles without causing a breakdown on the dispersion. More importantly, however, the resulting properties of the coatings, inks, hot melt adhesives, and the like made from the dispersions of the present invention are superior in all properties over those obtained with the dispersions made according to the prior art techniques.

The polymerized fatty acid polyamide aqueous dispersions of this invention can contain various additives in addition to the above-noted materials, such as water soluble alkali metal salts of polymeric organic acids and protective colloids such as lignin derivatives, proteins, water soluble cellulose derivatives, starch, alginic acid, and long chain alcohols and lecithin. The amount of such additives employed can vary in amounts from 0.5% to about 10% based on the weight of the polyamide resin.

The polyamide dispersion may likewise contain other materials such as viscosity modifiers, plasticizers, dyes, pigments and the like. In this regard, it should be noted that the excellent stability of the polymerized fatty acid polyamide resin dispersions of this invention allow substantial loadings of additives without adversely affecting the overall stability of the polyamide dispersion.

Additional objects, advantages, and novel features of this invention will become apparent to those skilled in the art upon examination of the following examples thereof, which are not intended to be limiting.

EXAMPLE 1

300.0 g Uni-Rez 2940 polyamide resin (Union Camp Corp., Wayne, N.J.) was charged to a 2 liter resin kettle and heated to a 150° C. Once molten, a solution of 3.18 g Tergitol NP-40 surfactant (Union Carbide, Danbury, Conn.), 1.00 g acetic acid, and 49.76 g water was added dropwise with rapid stirring. Once this solution had been added, a solution of 1.89 g Terigtol NP-40, 0.52 g glycine, and 252.14 g water was added to invert the emulsion. The resulting material was a cream-colored fluid dispersion of good quality with no grit, as all of sample passed freely through a wire screen.

EXAMPLE 2

408.2 g Uni-Rez 2622 polyamide resin (Union Camp Corp., Wayne, N.J.), 6.00 g Terigtol NP-40 (Union Carbide, Danbury, Conn.), 3.53 g acetic acid, and 67.85 g water were charged to the emulsion side of a Parr pressure reactor (Parr Instrument Co., Moline, Ill.). To the water side of the system were charged 1.91 g Tergitol NP-40 (Union Carbide, Danbury, Conn.), 4.38 g glycine and 338.3 g water. The resulting material was initially fluid but thickened slightly upon cooling. About 10 ml of tap water was added to reduce the viscosity to an acceptable level.

EXAMPLE 3

300.8 g Uni-Rez 2940 polyamide resin (Union Camp Corp., Wayne, N.J.) was charged to a 1 liter resin kettle equipped with a stirrer, addition funnel and condenser. The resin was heated to 150° C. with stirring and a solution of 6.18 g Terigtol NP-40 surfactant (Union Carbide, Danbury, Conn.), 0.72 g potassium hydroxide, and 50.81 g water was added dropwise. After addition of the solution, 260.0 g water was added with rapid stirring. The resulting material was a white fluid dispersion which appeared to be good quality, despite containing a great deal of persistent foam. The resulting material thickened to a hard solid upon cooling.

EXAMPLE 4

A high acid number, experimental polyamide resin was prepared by reacting 1098 grams of Dimer 22 (Union Camp Corporation) with a combination of 67.5 grams ethylenediamine and 43.5 grams hexane diamine. The resulting polymer had an acid value of 43 and a ring & ball softening point of 70° C.

The resin was dispersed using the batch inversion process. 300 grams of the resin were charged to a glass resin kettle and heated to 120° C. with moderate agitation. To this was added an aqueous solution containing 6 grams Tergitol NP-40 (Union Carbide), 6 grams of 85% KOH and 50 grams water. This mixture was allowed to equilibrate and the primary emulsion inverted by adding an aqueous solution containing 1 gram glycine in 300 grams of water. The resulting dispersion was cooled to ambient and filtered through 50 um bag material.

The resulting material was a white fluid dispersion at 40% solids. This dispersion was very stable to separation and showed no viscosity changes over a 6 month period.

EXAMPLE 5

The resin above was dispersed with the same surfactant package with the exception that the glycine was deleted from the formulation. The resulting material was a white dispersion which thickened into a paste upon cooling. Addition of extra water had little effect on breaking up the gel structure.

What is claimed is:

1. In a method for preparing an aqueous dispersion of polyamide resin comprising the steps of:
   heating said resin to at least its melting point to liquify said resin;
   mixing said liquified resin with water and an amount of surfactant effective to form an emulsion of said liquified resin in water;
   subjecting the mixed resin, water, and surfactant to comminuting forces; and
   cooling the mixture below the melting temperature of said resin;
the improvement which comprises mixing at least one chemical moiety selected from the group consisting of amino acid of the formula

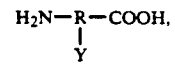

anionic and cationic salts derived therefrom and mixtures thereof, wherein "R" represents any alkyl, alkenyl or aryl group of one to ten carbon atoms and "Y" is any polar or non-polar ionic or non-ionic substituent, with said liquified resin, water, and surfactant in an amount effective to improve the stability of said aqueous dispersion.

2. In a method for preparing an aqueous dispersion of an amorphous, non-solvated, polymerized fatty acid polyamide resin, the polymerized fatty acid portion of which is obtained by polymerization of a saturated, ethylenically unsaturated or acetylenically unsaturated monobasic carboxylic acid containing 8 to 24 carbon atoms, comprising the steps of:
   heating said resin to at least its melting point to liquify said resin;
   mixing said liquified resin with water and an amount of surfactant effective to form an emulsion of said liquified resin in water;
   subjecting the mixed resin, water, and surfactant to comminuting forces; and
   cooling the mixture below the melting temperature of said resin;

the improvement which comprises mixing at least one chemical moiety selected from the group consisting of amino acid of the formula

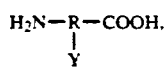

anionic and cationic salts derived therefrom and mixtures thereof, wherein "R" represents any alkyl, alkenyl or aryl group of one to ten carbon atoms and "Y" is any polar or non-polar ionic or non-ionic substituent, with said liquified resin, water, and surfactant in an amount effective to improve the stability of said aqueous dispersion.

3. In a method for preparing an aqueous dispersion of polyamide resin comprising the steps of:
 mixing said resin in solidified form with water and an amount of surfactant effective to form an emulsion of said resin in water when said resin is in liquified form;
 heating the mixture to a temperature which is at least as high as the melting point of said resin;
 subjecting the mixed resin, water, and surfactant to comminuting forces; and
 cooling said mixture below the melting temperature of said resin;
the improvement which comprises mixing at least one chemical moiety selected from the group consisting of amino acid of the formula

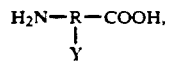

anionic and cationic salts derived therefrom and mixtures thereof, wherein "R" represents any alkyl, alkenyl or aryl group of one to ten carbon atoms and "Y" is any polar or non-polar ionic or non-ionic substituent, with said liquified resin, water, and surfactant in an amount effective to improve the stability of said aqueous dispersion.

4. In a method for preparing an aqueous dispersion of polyamide resin comprising the steps of:
 mixing said resin in solidified form with water and an amount of surfactant effective to form an emulsion of said water in said resin when said resin is in liquified form;
 heating the mixed resin, water, and surfactant to a temperature which is at least as high as the softening point of said resin;
 adding to the mixture an amount of inversion water effective to form an emulsion of said resin in water; and
 cooling the mixture below the melting point of said resin;
the improvement which comprises adding at least one chemical moiety selected from the group consisting of amino acid of the formula

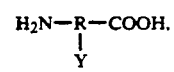

anionic and cationic salts derived therefrom and mixtures thereof, wherein "R" repredents any alkyl, alkenyl or aryl group of one to ten carbon atoms and "Y" is any polar or non-polar ionic or non-ionic substituent, with said liquified resin, water, and surfactant in an amount effective to improve the stability of said aqueous dispersion.

5. A method for preparing an aqueous dispersion of polyamide resin comprising the steps of:
 heating said resin to at least its melting point to liquify said resin;
 mixing said liquified resin with water, an amount of surfactant effective to form an emulsion of said liquified resin in water, and a dispersion stabilizing amount of at least one chemical moiety selected from the group consisting of amino acid of the formula

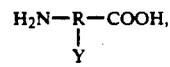

anionic and cationic salts derived therefrom and mixtures thereof, wherein "R" represents any alkyl, alkenyl or aryl group of one to ten carbon atoms and "Y" is any polar or non-polar ionic or non-ionic substituent, with said liquified resin, water, and surfactant in an amount effective to improve the stability of said aqueous dispersion.

6. A stable aqueous dispersion of polyamide resin and water comprising at least one chemical moiety selected from the group consisting of amino acid of the formula

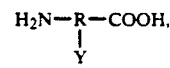

anionic and cationic salts derived therefrom and mixtures thereof, wherein "R" represents any alkyl, alkenyl or aryl group of one to ten carbon atoms and "Y" is any polar or non-polar ionic or non-ionic substituent, with said liquified resin, water, and surfactant in an amount effective to improve the stability of said aqueous dispersion.

7. A stable aqueous dispersion of polyamide resin in water comprising at least one chemical moiety selected from the group consisting of amino acid of the formula

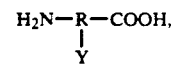

anionic and cationic salts derived therefrom and mixtures thereof, wherein "R" represents any alkyl, alkenyl or aryl group of one to ten carbon atoms and "Y" is any polar or non-polar ionic or non-ionic substituent, in an amount effective to improve the stability of said aqueous dispersion.

8. In a method for preparing an aqueous dispersion of polyamide resin comprising the steps of:
 heating said resin to at least its melting point to liquify said resin;
 mixing said liquified resin with water and an amount of surfactant effective to form an emulsion of said liquified resin in water;
 subjecting the mixed resin, water, and surfactant to comminuting forces; and
 cooling the mixture below the melting temperature of said resin;
the improvement which comprises mixing at least one chemical moiety selected from the group consisting of para-aminobenzoic acid and glycine with said liquified resin, water, and surfactant in an amount effective to improve the stability of said aqueous dispersion.

9. The method of claim 8 wherein the resin is heated to a temperature at which the resin melt viscosity is about 5000 cps as measured by a Brookfield viscometer.

10. The method of claim 8 wherein the water is mixed with said liquified resin and surfactant in an amount sufficient to form an emulsion comprising between about 10 and about 60 percent resin by weight.

11. The method of claim 8 wherein the water mixed with said liquified resin and surfactant has a temperature such that the temperature of the mixture is above the softening point of the resin.

12. The method of claim 8 wherein the step of subjecting the mixture to comminuting forces forms an emulsion of droplets of said liquified resin in water having an average volume size distribution of less than 5 microns.

13. The method of claim 8 wherein the step of cooling the mixture below the melting temperature of said resin forms finely dispersed particles of said resin in water having average size less than about 10 microns.

14. The method of claim 8 wherein the step of cooling the mixture below the melting temperature of said resin forms finely dispersed particles of said resin in water having average size less than about 2 microns.

15. The method of claim 8 further comprising mixing acid with said liquified resin, water, and surfactant in an amount sufficient to neutralize an amine number up to about 8.

16. The method of claim 8 further comprising mixing base with said liquified resin, water, and surfactant in an amount sufficient to neutralize an acid number up to about 8.

17. In a method for preparing an aqueous dispersion of an amorphous, non-solvated, polymerized fatty acid polyamide resin, the polymerized fatty acid portion of which is obtained by polymerization of a saturated, ethylenically unsaturated or acetylenically unsaturated monobasic carboxylic acid containing 8 to 24 carbon atoms, comprising the steps of:
heating said resin to at least its melting point to liquify said resin;
mixing said liquified resin with water and an amount of surfactant effective to form an emulsion of said liquified resin in water;
subjecting the mixed resin, water, and surfactant to comminuting forces; and
cooling the mixture below the melting temperature of said resin;
the improvement which comprises mixing at least one chemical moiety selected from the group consisting of para-aminobenzoic acid and glycine with said liquified resin, water, and surfactant in an amount effective to improve the stability of said aqueous dispersion.

18. The method of claim 17 wherein:
said polyamide resin is an amorphous, nonsolvated, polymerized fatty acid polyamide resin, the polymerized fatty acid portion thereof obtained by polymerization of a saturated, ethylenically unsaturated or acetylenically unsaturated monobasic carboxylic acid containing 8 to 24 carbon atoms;
said polyamide resin has an acid number of up to about 45 and an amine number of up to about 250;
the percentage of said resin in said mixture with water is between about 20 and about 60 percent;
said surfactant is other than the salt of an organic primary amine; and
the step of subjecting the mixture to comminuting forces forms an emulsion of droplets of said liquified resin in water having an average volume size distribution of less than about 20 microns.

19. In a method for preparing an aqueous dispersion of polyamide resin comprising the steps of:
mixing said resin in solidified form with water and an amount of surfactant effective to form an emulsion of said resin in water when said resin is in liquified form;
heating the mixture to a temperature which is at least as high as the melting point of said resin;
subjecting the mixed resin, water, and surfactant to comminuting forces; and
cooling said mixture below the melting temperature of said resin;
the improvement which comprises mixing at least one chemical moiety selected from the group consisting of para-aminobenzoic acid and glycine with said solidified resin, water, and surfactant in an amount effective to improve the stability of said aqueous dispersion.

20. The method of claim 19 wherein:
said polyamide resin is an amorphous, nonsolvated, polymerized fatty acid polyamide resin, the polymerized fatty acid portion thereof obtained by polymerization of a saturated, ethylenically unsaturated or acetylenically unsaturated monobasic carboxylic acid containing 8 to 24 carbon atoms;
said polyamide resin has an acid number of up to about 45 and an amine number of up to about 250;
the percentage of said resin in said mixture with water is between about 20 and about 60 percent;
said surfactant is other than the salt of an organic primary amine; and
the step of subjecting the mixture to comminuting forces forms an emulsion of droplets of said liquified resin in water having an average volume size distribution of less than about 20 microns.

21. In a method for preparing an aqueous dispersion of polyamide resin comprising the steps of:
mixing said resin in solidified form with water and an amount of surfactant effective to form an emulsion of said water in said resin when said resin is in liquified form;
heating the mixed resin, water, and surfactant to a temperature which is at least as high as the softening point of said resin;
adding to the mixture an amount of inversion water effective to form an emulsion of said resin in water; and
cooling the mixture below the melting point of said resin;
the improvement which comprises adding at least one chemical moiety selected from the group of para-aminobenzoic acid and glycine to the mixture with said inversion water in an amount effective to improve the stability of said aqueous dispersion.

22. The method of claim 21 wherein the resin is heated to a temperature at which the resin melt viscosity is about 5000 cps as measured by a Brookfield viscometer.

23. The method of claim 21 wherein said water is mixed with said solidified resin such that said water comprises less than about 25% by weight of the mixture.

24. The method of claim 21 wherein said inversion water is added to the mixture in an amount sufficient to form an emulsion comprising between about 10 and about 60 percent said resin by weight.

25. The method of claim 21 wherein the step of cooling the mixture below the melting temperature of said resin forms finely dispersed particles of said resin in water having average size less than about 10 microns.

26. The method of claim 21 wherein the step of cooling the mixture below the melting temperature of said resin forms finely dispersed particles of said resin in water having average size less than about 2 microns.

27. The method of claim 21 further comprising mixing acid with said solidified resin, water, and surfactant in an amount sufficient to neutralize an amine number up to about 8.

28. The method of claim 21 further comprising mixing base with said solidified resin, water, and surfactant in an amount sufficient to neutralize an acid number up to about 8.

29. A method for preparing an aqueous dispersion of polyamide resin comprising the steps of:
heating said resin to at least its melting point to liquify said resin;
mixing said liquified resin with water, an amount of surfactant effective to form an emulsion of said liquified resin in water, and a dispersion stabilizing amount of at least one chemical moiety selected from the group consisting of para-aminobenzoic acid and glycine;
subjecting the mixed resin, water, and surfactant to comminuting forces; and
cooling the mixture below the melting temperature of said resin.

30. The aqueous dispersion of claim 29 comprising from about 10 to about 60 weight percent of said polyamide resin.

31. The aqueous dispersion of claim 29 wherein the polyamide resin comprises dispersed resin particles having average diameter less than 10 microns.

32. The aqueous dispersion of claim 29 wherein the polyamide resin comprises dispersed resin particles having average diameter less than 2 microns.

33. The aqueous dispersion of claim 29 wherein the particles are uniformly dispersed in the water to form the dispersion having a stability against separation into separate phases at ambient temperatures in excess of 24 hours.

34. The aqueous dispersion of claim 29 wherein the particles are uniformly dispersed in the water to form the dispersion having a stability against gelation at ambient temperatures in excess of 24 hours.

35. The aqueous dispersion of claim 29 wherein the polyamide resin comprises dispersed particles of an amorphous a nonsolvated, low acid, low amine number polymerized fatty acid polyamine resin having a volume average particle size distribution of less than 20 microns.

36. A stable aqueous dispersion of polyamide resin in water comprising at least one chemical moiety selected from the group consisting of para-aminobenzoic acid and glycine in an amount effective to improve the stability of said aqueous dispersion.

* * * * *